United States Patent [19]

Henszey

[11]  4,361,424
[45]  Nov. 30, 1982

[54] GAS SEPARATING DEVICE

[76] Inventor: Richard R. Henszey, 4646 N. Hewitts Rd., Oconomowoc, Wis.

[21] Appl. No.: 230,900

[22] Filed: Feb. 2, 1981

[51] Int. Cl.³ .............................................. B01D 19/00
[52] U.S. Cl. ...................................... 55/205; 55/348; 55/460
[58] Field of Search .................... 55/52, 204, 205, 348, 55/457, 459 C, 460

[56] References Cited

U.S. PATENT DOCUMENTS

| 2,346,005 | 4/1944 | Bryson | 55/457 X |
| 2,401,079 | 5/1946 | Jones et al. | 55/205 X |
| 2,848,060 | 8/1958 | McBride et al. | 55/459 C X |
| 2,874,799 | 2/1959 | van der Kolk | 55/460 X |
| 3,007,542 | 11/1961 | Giampapa et al. | 55/52 |
| 3,339,350 | 9/1967 | Sims | 55/457 X |
| 3,452,518 | 7/1969 | Skaug et al. | 55/204 |
| 3,566,584 | 3/1971 | Ruthrof et al. | 55/460 X |
| 3,771,290 | 11/1973 | Stethem | 55/205 |

Primary Examiner—Robert H. Spitzer
Attorney, Agent, or Firm—Michael, Best & Friedrich

[57] ABSTRACT

A device for separating gas from a liquid sample stream including a housing defining a vertical, cylindrical chamber, a tangential fluid inlet for introducing a sample stream into the top portion of the chamber, a tangential outlet through which the liquid portion of the sample flows from the bottom of the chamber, a tubular-like gas separator unit in the top of the chamber, a gas outlet opening to the upper end of the gas separator unit, and a capillary tube connected to the gas outlet. The gas separator unit includes a spirally extending wall spaced radially inwardly from the top of the chamber wall to define an annular passage open to the fluid inlet. The side edges of the spiral wall are arranged to define a vertically extending opening therebetween. The sample stream entering through the inlet under pressure initially flows circumferentially through the annular passage, the heavier liquid portion tends to follow the chamber wall, and a substantial portion of the gas bubbles in the sample is separated therefrom and "scooped" into the gas separator unit through the vertical opening. The gas separated from the sample and collecting inside the gas separation unit flows through the capillary tube which restricts flow so as to minimize the overflow of liquid.

7 Claims, 7 Drawing Figures

GAS SEPARATING DEVICE

BACKGROUND OF THE INVENTION

This invention relates to sampling systems for liquids containing radioactive materials and, more particularly, to devices for separating gases contained in a sample stream of such a liquid prior to introduction into instrumentation which operates erratically or produces inaccurate measurements when gas bubbles are present.

In the operation of nuclear power plants and the like, various fluid samples are monitored by continuous or periodic sampling. The sample fluids quite commonly are liquids containing reasonably large amounts of gas bubbles which can cause erratic operation and/or adversely affect the accuracy of instrumentation in the sampling system, particularly flow meters and some types of analyzer. Consequently, at least most of the gas bubbles must be separated from the liquid prior to introduction into the instrumentation.

The internal volume of any device used with fluids containing radioactive materials should have as a small internal volume as possible in order to minimize the amount of shielding required to meet safety standards.

Gravity separation devices wherein the gas is allowed to bubble upwardly for removal from the top of the device and the liquid is removed from the bottom have been used for this purpose. Such devices typically include some type of float arrangement for preventing excess amounts of the liquid from flowing overboard. Small floats requiring a relatively small internal volume tend to eventually stick during use, making the separator ineffective. Furthermore, once such a float sticks, it is quite difficult to free it in an intense radioactive environment. On the other hand, floats with cage arrangements to minimize sticking require large internal volumes which necessitate an excessive amount of shielding.

SUMMARY OF THE INVENTION

One of the principal objects of the invention is to provide a device for separating gasses from a liquid sample and having a minimum internal volume.

Another of the principal objects of the invention is to provide such a device which does not include any moving parts such as a float or the like.

Other objects, aspects and advantages of the invention will become apparent to those skilled in the art upon reviewing the following detailed description, the drawings and the appended claims.

The gas separating device provided by the invention includes a housing defining an elongated, vertical chamber having a circular cross section, a tangential fluid inlet for introducing a liquid sample stream containing gas into top portion of the chamber, a tangential outlet through which the liquid portion of the sample flows from the bottom of the chamber, an elongated, tubular-like gas separator unit located in the top portion of the chamber, and a gas outlet opening into the upper end of the gas separator unit and including a gas flow restricting means. The gas separator unit has a spirally extending wall spaced radially inwardly from the chamber wall to define an annular passage open to the fluid inlet. The spiral wall has a first side edge located in the vicinity of the fluid inlet and a second side edge spaced radially inwardly from the first side edge to define a vertically extending opening therebetween. The sample stream entering the inlet under pressure initially flows circumferentially through the annular passage and a substantial portion of the gas bubbles in the sample is separated therefrom and enters into the gas separator unit through the vertical opening. The gas separated from the sample and collecting inside the gas separator unit exits through the gas outlet and the flow restricting means, such as a capillary tube, minimizes the overflow of liquid through the outlet. A laterally extending partition can be provided inside the gas separator unit to serve both as an anti-vortexing baffle and as an internal brace for the spiral wall.

DESCRIPTION OF THE PREFERRED EMBODIMENT

Figure 1:
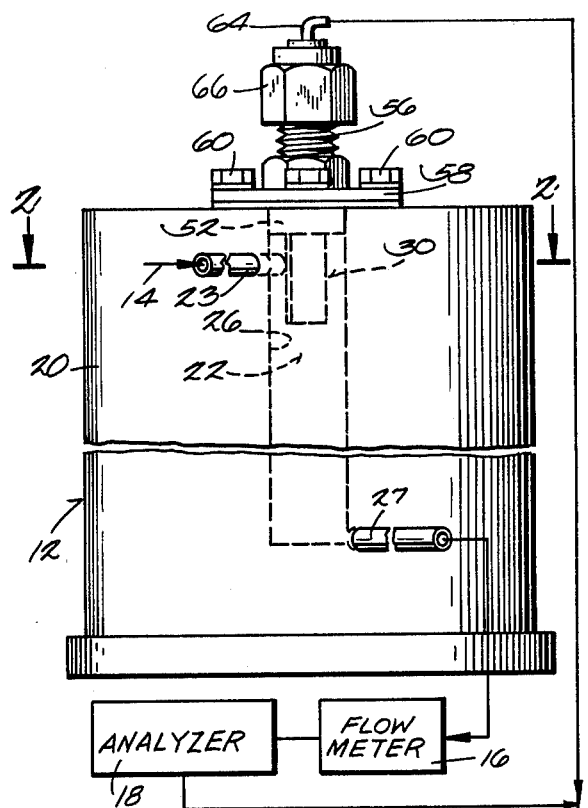
FIG. 1 is a fragmentary, side elevation view of a gas separating device of the invention shown connected in a diagrammatically illustrated sampling sytem.

Illustrated in FIG. 1 is a portion of sampling system for a nuclear power plant incorporating a gas separating device 12 of the invention. A liquid sample stream 14 containing gas bubbles and a radioactive material is passed through the gas separating device 12. The liquid portion of the sample flows from the bottom of the gas separation device 12, passes through a flow meter 16 (illustrated diagrammatically), and then through an analyzer (illustrated diagrammatically) 18. The gas separated from the liquid sample is vented from the top of the gas separating device 12 and recombined with the liquid portion at a point downstream of the analyzer 18 for disposal in a suitable manner.

The gas separating device 12 includes a housing 20 defining an elongated, vertical chamber 22 having a circular cross section. While the chamber 22 can be conical and have other suitable configurations used in conventional cyclone-type separators, it preferably is cylindrical because such a configuration is as effective as conical and yet is less expensive to manufacture, as explained in more detail below.

The sample stream 14 is introduced under pressure into the top portion of the chamber 22 through a duct or tube 23 disposed in an intake port 24 located tangentially to the chamber 22. This creates a vortexing action. The heavier liquid portion follows the chamber wall 26, spirals helically downwardly through the chamber 22 and exits from the bottom of the chamber through a duct or tube 27 disposed in an outlet port 28 located tangentially to the chamber 22.

Gas bubbles in the sample are collected in an elongated, tubular-like gas separator unit 30 located generally centrally in the top portion of the chamber 22. The gas separator unit 30 (FIGS. 2 and 3) includes a spirally extending wall 32 having an outer surface 34 which is spaced radially inwardly from the chamber wall 26 to define a generally annular passage 36 open to the fluid intake port 24. One side edge 38 of the spiral wall 32 is located in the vicinity of the intake port 24 and the other side edge 40 is spaced radially inwardly from the side edge 38 to define a vertical opening 42 therebetween. As the sample initially flows circumferentially through the annular passage 36, the heavier liquid portion tends to be moved radially outwardly against the chamber wall 26 by centrifugal force and a substantial portion of the lighter gas bubbles separates from the liquid and is "scooped" into the interior of the gas separator unit 30 through the vertical opening 42. The gas separating unit 30 is open at the bottom to permit the collection of additional gas released into the low pressure center of the vortexing liquid column in the chamber 22.

Extending laterally between and connected to the side edge 40 of the spiral wall 32 and the inner surface 44 of the spiral wall 32, at a location intermediate the side edges, is a vertical partition 46 which serves both as an internal brace for the spiral wall and as an anti-vortex baffle for the gases accumulating inside the gas separator unit 30. The lower edge 48 (FIG. 3) of the partition 46 is spaced upwardly from the bottom edge 50 of the spiral wall 32 so as not to interfere with the desired vortexing action of the liquid below the gas separating unit 30.

Figure 4:
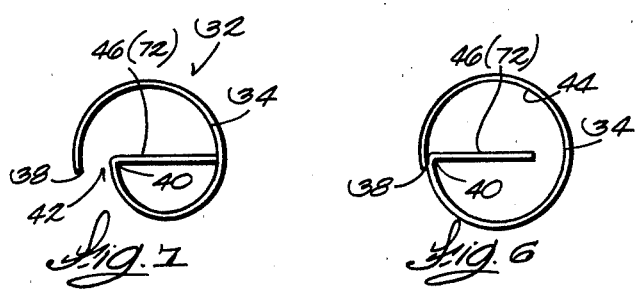
FIG. 4 is a side elevation view of the vent cap assembly of the gas separating device in FIG. 1.

The gas collected inside the gas separator unit 30 passes out of the chamber 22 through an outlet opening into the top end of the gas separator unit 30. More specifically, the top end of the gas separator unit 30 (FIGS. 1 and 4) is affixed on and depends from a circular collar 52 of a vent cap assembly 54 including an externally threaded fitting 56, a circular flange 58 which is mounted on the top end of the housing 20 by bolts 60 or the like, and a gas outlet 62 which extends therethrough and is located centrally relative to the chamber 22. The collar 52 fits into the top end of the chamber 22 and locates the spiral wall 32 of the gas separator unit 30 relative to the chamber wall 26.

Gas flow through the gas outlet 62 is restricted in order to minimize, and preferably substantially eliminate, the overflow of liquid with the gases. Various suitable flow restricting means can be used. In the construction illustrated, the desired flow restriction is provided by a capillary tube 64 (fragmentarily and diagrammatically illustrated in FIG. 1) having a known pressure drop for a given inlet pressure. The capillary tube 64 has threaded adapter 66 (one shown) on the opposite ends. One adapter 66 is threaded onto the vent cap fitting 56 and the other is threaded onto a fitting (not shown) located in the sampling system downstream of the analyzer 18. As a guide, a tube having an inside diameter of approximately 0.038 inch and a length of approximately 24 inches can be used for smaller units. The gas separated from the sample in the chamber 22 flows through the capillary tube 64 and is recombined with the liquid portion downstream of the analyzer 18.

Figure 2:
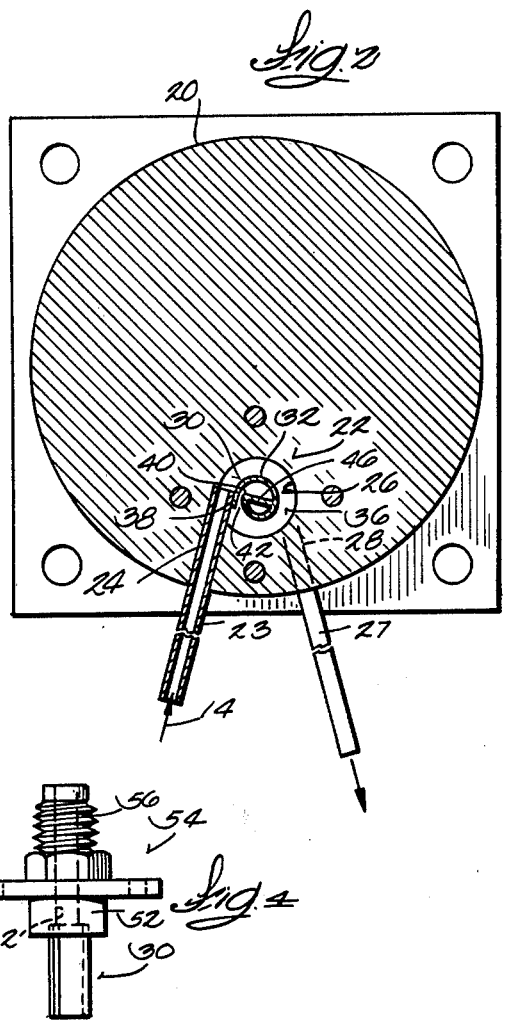
FIG. 2 is a sectional view taken generally along the line 2—2 in FIG. 1.
Figure 3:
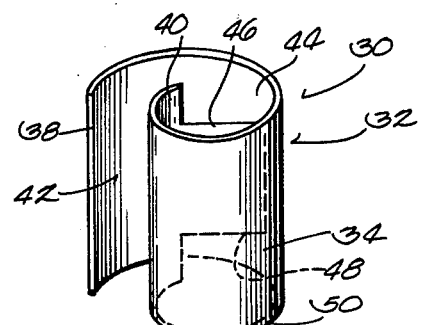
FIG. 3 is a perspective view of the gas separation unit of the gas separating device in FIG. 1.

The housing 20 can be conveniently formed from a single piece of material. For example, the housing 20 for smaller units can be made from a cylindrical stainless steel bar approximately 4 inches in diameter and approximately 4 inches long. The chamber 22 can be conveniently formed in the bar with a ½ inch drill and a flat end mill to provide a substantially flat bottom which is an integral part of the housing. The chamber 22 preferably is formed eccentrically in the bar as best shown in FIG. 2 to provide a substantially thicker wall section on the side the operator is located during normal operation. This thicker wall section serves as radioactive shielding. The tangential intake and outlet ports 24 and 28 can be conveniently formed in the bar by drilling.

Figures 6, 7:
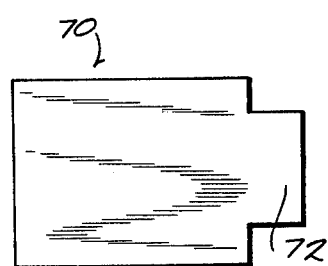
FIGS. 6 and 7 are top end views illustrating the steps for forming the gas separator unit from the sheet shown in FIG. 5.
Figure 5:
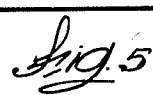
FIG. 5 is a plan view of a sheet of material from which the gas separator unit is formed.

The spiral wall 32 of the gas separator unit 30 can be conveniently formed as a one-piece unit in order to minimize fabrication and assembly costs. Referring to FIGS. 5-7, this can be accomplished by starting with a flat sheet 70 of material, such as stainless steel, including a tab 72 dimensioned to form the partition 46. After the tab 72 has been bent 90°, the sheet 70 is rolled into a cylindrical form as shown in FIG. 6, the end with the bent tab is depressed and the free end of the tab 72 is affixed to the inner surface of the sheet as shown in FIG. 7. The spiral wall 32 is affixed on the circular collar 52 of the vent cap assembly 54 to form the vent cap assembly shown in FIG. 4. When installed in the top end of the chamber 22, the flange 58 of the vent cap assembly serves as a cover for the housing.

From the foregoing description, one skilled in the art can easily ascertain the essential characteristics of the invention and, without departing from the spirit and scope thereof, make various changes and modifications to adapt it to various usages.

I claim:

1. A device for separating gas from a liquid sample stream containing gas comprising
   a housing defining an elongated vertical chamber having a circular cross section and top and bottom portions;
   a tangential fluid inlet in said housing for introducing the sample stream into the top portion of said chamber;
   a tangential liquid outlet in said housing through which the liquid portion of the sample flows from the bottom portion of said chamber;
   an elongated, tubular-like gas separator unit generally centrally located in the top portion of said chamber, said gas separator unit including a lower end opening into said chamber and an upper end and further including a spirally extending wall having an outer surface spaced radially inwardly from the chamber wall to define an annular passage open to said inlet, said spiral wall further having an inner surface, a first side edge located in the vicinity of said inlet, and a second side edge to define a vertically extending opening therebetween;
   a laterally extending anti-vortexing baffle disposed inside said spiral wall; and
   a gas outlet opening into the upper end of said gas separator unit and including a gas flow restricting means, whereby the sample stream entering through said inlet initially flows circumferentially through said annular passage, a substantial portion of the gas bubbles in the sample is separated therefrom and enters into said gas separator unit through said vertical opening, and the gas separated from the sample and collecting inside said gas separator unit exits through said gas outlet with said flow restricting means minimizing the overflow of liquid through said gas outlet.

2. A device according to claim 1 wherein said baffle extends between and is connected to said second side edge of said spiral wall and the inner surface of said spiral wall at a location intermediate said first and second side edges.

3. A device according to claim 2 wherein said spiral wall has a bottom edge and said baffle has a lower edge spaced upwardly from the bottom edge of said spiral wall.

4. A device according to claim 3 wherein said spiral wall and said baffle are formed as a one-piece unit.

5. A device according to claim 1 wherein said chamber is cylindrical.

6. A device according to claim 5 wherein
said housing is made from a cylindrical metal bar; and
said chamber is eccentrically located in said bar and formed therein such that the bottom of said chamber is an integral part of said bar.

7. A device according to claim 1 wherein said gas flow restricting means comprises a capillary tube having a predetermined pressure drop connected to said gas outlet.

* * * * *